US007704553B2

(12) United States Patent
Watson et al.

(10) Patent No.: US 7,704,553 B2
(45) Date of Patent: Apr. 27, 2010

(54) DEPOSITING NANOMETER-SIZED PARTICLES OF METALS ONTO CARBON ALLOTROPES

(75) Inventors: Kent A. Watson, New Kent, VA (US); Michael J. Fallbach, Sedalia, CO (US); Sayata Ghose, Newport News, VA (US); Joseph G. Smith, Smithfield, VA (US); Donavon M. Delozier, Newport News, VA (US); John W. Connell, Yorktown, VA (US)

(73) Assignees: National Institute of Aerospace Associates, Hampton, VA (US); The United States of America as represented by the Administrator of NASA, Washington, DC (US)

( * ) Notice: Subject to any disclaimer, the term of this patent is extended or adjusted under 35 U.S.C. 154(b) by 489 days.

(21) Appl. No.: 11/710,386

(22) Filed: Feb. 23, 2007

(65) Prior Publication Data
US 2007/0292699 A1 Dec. 20, 2007

Related U.S. Application Data

(60) Provisional application No. 60/780,173, filed on Mar. 6, 2006.

(51) Int. Cl.
  *B05D 7/00* (2006.01)
  *B05D 3/02* (2006.01)
(52) U.S. Cl. .................. 427/217; 427/229; 427/591; 427/592

(58) Field of Classification Search .............. 427/180, 427/201, 215, 217, 457, 473, 474, 190, 191, 427/226, 229, 591, 592
See application file for complete search history.

(56) References Cited

U.S. PATENT DOCUMENTS 5,120,699 A * 6/1992 Weiss et al. ................. 502/185
5,453,324 A * 9/1995 Shuford ...................... 428/408

(Continued)

OTHER PUBLICATIONS

Ghose et al., Incorporation of multi-walled carbon nanotubes into high temperature resin using dry mixing techniques, Composites: Part A 37, 465-475 (2006).*

*Primary Examiner*—H. (Holly) T Le
(74) *Attorney, Agent, or Firm*—George F. Helfrich; Auzville Jackson, Jr.; Robin W. Edwards

(57) ABSTRACT

A process for depositing nanometer-sized metal particles onto a substrate in the absence of aqueous solvents, organic solvents, and reducing agents, and without any required pretreatment of the substrate, includes preparing an admixture of a metal compound and a substrate by dry mixing a chosen amount of the metal compound with a chosen amount of the substrate; and supplying energy to the admixture in an amount sufficient to deposit zero valance metal particles onto the substrate. This process gives rise to a number of deposited metallic particle sizes which may be controlled. The compositions prepared by this process are used to produce polymer composites by combining them with readily available commodity and engineering plastics. The polymer composites are used as coatings, or they are used to fabricate articles, such as free-standing films, fibers, fabrics, foams, molded and laminated articles, tubes, adhesives, and fiber reinforced articles. These articles are well-suited for many applications requiring thermal conductivity, electrical conductivity, antibacterial activity, catalytic activity, and combinations thereof.

9 Claims, 3 Drawing Sheets

U.S. PATENT DOCUMENTS

| | | | |
|---|---|---|---|
| 5,525,568 A * | 6/1996 | Yamaguchi et al. | 502/185 |
| 5,759,230 A * | 6/1998 | Chow et al. | 75/362 |
| 6,579,564 B2 | 6/2003 | Chen et al. | |
| 6,592,938 B1 * | 7/2003 | Pessey et al. | 427/212 |
| 6,624,109 B2 | 9/2003 | Murthy et al. | |
| 6,680,279 B2 * | 1/2004 | Cai et al. | 502/327 |
| 6,756,119 B1 * | 6/2004 | Clough | 428/403 |
| 6,800,584 B2 | 10/2004 | Baker et al. | |
| 6,919,065 B2 | 7/2005 | Zhou et al. | |
| 6,958,308 B2 * | 10/2005 | Brown | 502/180 |
| 7,138,159 B2 * | 11/2006 | Hampden-Smith et al. | 427/376.1 |
| 7,476,639 B2 * | 1/2009 | Koch et al. | 502/240 |
| 2001/0031372 A1 * | 10/2001 | Ostolski | 428/570 |
| 2005/0090387 A1 | 4/2005 | Niihara et al. | |
| 2005/0176989 A1 | 8/2005 | Coleman et al. | |
| 2005/0176990 A1 | 8/2005 | Coleman et al. | |
| 2005/0220988 A1 * | 10/2005 | Dodelet et al. | 427/113 |
| 2006/0229466 A1 | 10/2006 | Arhancet et al. | |
| 2008/0241543 A1 * | 10/2008 | Kempf et al. | 428/403 |

* cited by examiner

DEPOSITING NANOMETER-SIZED PARTICLES OF METALS ONTO CARBON ALLOTROPES

CROSS-REFERENCE TO RELATED APPLICATION

This application claims the benefit of U.S. Provisional Application No. 60/780,173 filed on Mar. 6, 2006 for "Method of Depositing Metals Onto Carbon Allotropes and Compositions Therefrom".

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Cooperative Agreement No. NCC-1-02043 awarded by the National Aeronautics and Space Administration.

BACKGROUND OF THE INVENTION

1. Field of the Invention

This invention relates generally to depositing metals onto substrates. It relates particularly to a process for depositing nanometer-sized metal particles onto substrates, and to the compositions prepared by this process, as well as to polymer composites made from these compositions and articles produced from these composites.

2. Description of Related Art

The deposition of metallic particles onto various substrates, such as carbon nanotubes (i.e. single-walled, doubled-walled and multi-walled) and forms of graphite, is an active area of research. For example, in U.S. Patent Application 2005/0220988 A1, metal particles are deposited onto carbon nanotubes by immersing an electrically conducting substrate carrying the carbon nanotubes into a silane solution of a metal salt and subsequently reducing the metal using hydrogen gas. In U.S. Pat. No. 6,800,584 B2, gold particles are deposited onto graphite using an "incipient wetness" method wherein a solution of the gold salt in an organic solvent is added to the graphite substrate and stirred for up to eight hours. It is required that the graphite be pretreated with acid prior to this step and that a high temperature heating step be performed at temperatures ranging from 500° C. to 700° C. U.S. Pat. Nos. 6,624,109 B2 and 6,963,016 B1 disclose a method of depositing platinum and palladium, respectively, onto activated carbon. In both cases, the synthesis is conducted in ammonium hydroxide and requires the use of an aluminum compound as well. U.S. Pat. Nos. 5,120,699 and 5,155,081 disclose another method of placing platinum particles onto graphite. In these cases the synthesis is conducted in an aqueous solution and requires complex oxidation/reduction chemistry.

A large volume of publications have appeared that report the deposition of various metals onto substrates such as carbon nanotubes and other forms of carbon. In summary, they all use synthetic methods that are significantly different, in that they are more complex, and/or require the use of aqueous or organic solvents, oxidation/reduction reagents, and/or an extremely high temperature treatment (500° C. or higher).

Most of the publications report the use of a carbon substrate that is usually pretreated with acid to introduce functional groups on the surface, a metal salt or mixture of metal salts, and either water or an organic solvent.

Based on this related art, it is indeed surprising that a facile, simple, synthetic method could be found to deposit nanometer sized metallic particles onto substrates. In particular, it is especially surprising that such a process could be successful without the use of solvents or reducing agents. In fact, the large body of work already performed by those knowledgeable in the state-of-the-art and conventional theory suggests that such a simple method as described and claimed herein would not result in metal particle deposition at all.

BRIEF SUMMARY OF THE INVENTION

It is accordingly a primary object of the present invention to obviate the inadequacies of the related art, and to provide what is neither available therein nor envisioned therein, viz: a simple, facile, and cost effective process for depositing very small (especially nanometer-sized) particles of metal and metal alloys onto various substrates, such as carbon allotropes, e.g., carbon nanotubes and various forms of graphite.

It is also a primary object of the present invention to provide compositions prepared by such a process, which compositions are comprised of very small (especially nanometer-sized) particles of metals and metal alloys evenly distributed on the surface of the substrates, such as carbon allotropes.

It is another primary object of the present invention to provide polymeric composites which are prepared from these compositions.

It is yet another primary object of the present invention to provide articles of manufacture, which are produced from these polymeric composites.

These and other objects, as well as their attending benefits, are achieved by the process, compositions, polymeric composites, and articles, which are set forth in greater detail below. In summary, however, the process of the present invention comprehends the simple dry mixing of at least one metal compound and at least one substrate in the desired concentrations. After dry mixing is completed, the resulting admixture is exposed to energy (e.g., heat) in an amount sufficient to deposit zero valance metal particles onto the substrate. This method does not require any substrate pretreatment, or the use of any solvents or reducing agents, and is accordingly simple, facile, scalable, cost effective and is additionally applicable to a variety of metals, metal alloys, and substrates, especially carbon forms (allotropes). The resultant compositions are unique and are useful in a variety of applications such as catalysts in polymerizations and organic transformations, catalysts in fuel cells, sensors, and electrical and optical devices. Additionally, the compositions are combined with polymers to produce polymer composites having a unique combination of physical, thermal, electrical, mechanical and biological properties, which renders them eminently suitable in the fabrication of a wide variety of useful articles of manufacture.

BRIEF DESCRIPTION OF THE SEVERAL VIEWS OF THE DRAWINGS

For a more complete understanding of the present invention, including its primary objects and attending benefits, reference should be made to the Detailed Description of the Invention which is set forth below. This Detailed Description should be read together with the accompanying Drawings, wherein.

DETAILED DESCRIPTION OF THE INVENTION

Figure 1:
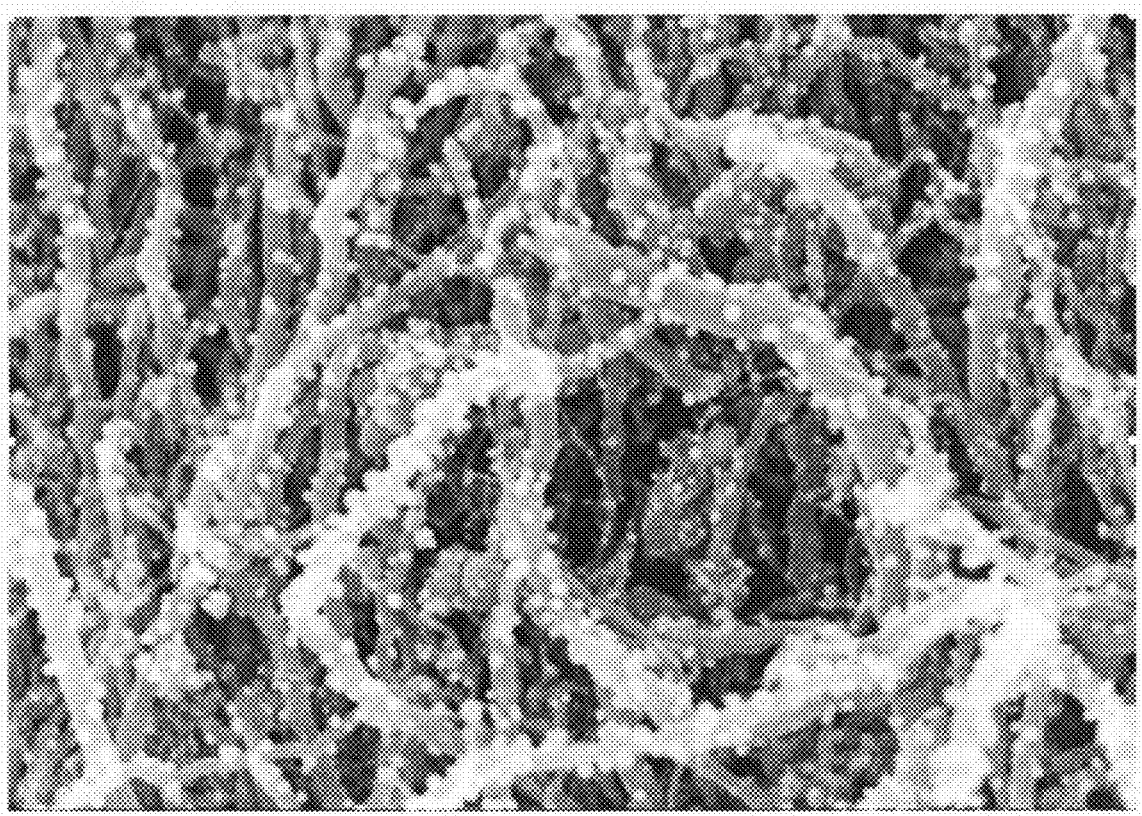
FIG. 1 is a drawing prepared from a high resolution scanning electron micrograph (HRSEM) of a composition according to the present invention, which has been prepared employing the procedure detailed in Example 1 below.

In a first aspect, the present invention is a process for depositing very small (viz., nanometer-sized) metal particles onto a substrate in the absence of aqueous solvents, organic solvents, and reducing agents, and without any required pretreatment of the substrate.

An admixture of a metal compound and a substrate is prepared by dry mixing a chosen amount of a metal compound with a chosen amount of a substrate. Energy is then supplied to the admixture in an amount sufficient to deposit zero valance metal particles onto the substrate.

Dry mixing of the metal compound and the substrate is preferably continued until substantial uniformity of the admixture is achieved, as determined, for example, by visual inspection. A wide variety of standard dry mixing techniques may be employed, including, but not limited to grinding with a mortar and pestle, mechanical shaking, ball milling, and ultrasonic agitation, among many others.

After mixing is complete, energy is supplied to the admixture, advantageously in the form of heat, as supplied by a standard oven. However other forms of energy may be employed with success such as microwave energy, as in a microwave oven, among others. The atmosphere surrounding the admixture may be air, or an inert gas such as nitrogen. The temperature required to effect deposition of zero valence metal particles onto the substrate is dependent upon the metal compound used. If a standard oven is employed, a preferred temperature for heat treatment for the following metal compounds (silver acetate, iron acetate, palladium acetate, platinum acetate, auric acid, palladium tetrachloride, palladium dichloride dimethylsulfide, platinum dichloride dimethylsulfide and platinum potassium chloride) is from about 250 degrees Celsius to about 350 degrees Celsius, for a time between about 0.5 hours to about 6 hours, with about 2 hours to about 4 hours being preferable.

Although a number of substrates may be employed in the instant process, carbon allotropes have been used very advantageously. Carbon allotropes are structurally differentiated forms of the element carbon. Examples of acceptable carbon allotropes are: amorphous carbon, carbon nanofibers, carbon nanofoam, diamond, fullerene, graphite, exfoliated graphite, single-walled carbon nanotubes, multi-walled carbon nanotubes, double-walled carbon nanotubes, lonsdaleite and aggregated diamond nanorods.

Preferred carbon allotropes are:

amorphous carbon, graphite, exfoliated graphite, single-walled carbon nanotubes, double-walled carbon nanotubes, carbon nanofibers, fullerenes and multi-walled carbon nanotubes.

Preferred metals are those listed in the periodic table as transition metals of Group VIIIA (Fe, Co, Ni, Ru, Rh, Pd, Os, Ir, and Pt), those of Group IB (Cu, Ag, and Au), those of Group IA (Li) and those of Group IIB (Zn, Cd, and Hg), including mixtures thereof. The metals Pd, Pt, Ag, and Au are especially preferred. The metals are in the form of a compound with another element or group. Preferable elements in the metal compound are halides, especially chloride. Preferable groups in the metal compound are organic nitrates and carboxylates, and especially acetates.

The concentration of the metal compound relative to the substrate, e.g., the carbon allotrope, influences the particle size of the metal that is subsequently deposited. Metal compound concentrations that ultimately result in final zero valence metal particle concentrations on the carbon allotrope of up to 50% by weight are preferable.

The compositions are characterized by high resolution scanning electron microscopy (HRSEM) to determine metal particle size and distribution. The oxidation state of the metal is determined by x-ray photoelectron spectroscopy and/or wide angle x-ray diffraction. The particle size of the metal particles which have been deposited has been generally determined to be between 1 and about 500 nanometers.

The compositions comprised of metal particles distributed onto the surfaces and/or within the interstices of various substrates, especially various forms of carbon, of the present invention can be used to produce polymer composites by combining them with commodity and engineering plastics to produce novel materials with advantageous characteristics. The term "polymer composites", as used herein, refers to a composition that comprises at least one substrate, e.g., one form of carbon with metal particles distributed thereon and at least one polymer. The polymers may be commodity or engineering plastics such as polycarbonate, polyacrylate, polyacrylonitrile, polyester, polyamide, polystyrene (including high impact strength polystyrene), polyurethane, polyurea, polyurethaneurea, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, cellulose polymer, or any combination thereof. These are commercially available from, for example, GE Plastics, Pittsfield, Mass.; Rohm & Haas Co., Philadelphia, Pa.; Bayer Corp.-Polymers, Akron, Ohio; Reichold; DuPont; Huntsman LLC, West Deptford, N.J.; BASF Corp., Mount Olive, N.J.; Dow Chemical Co., Midland, Mich.; GE Plastics; ExxonMobil Chemical Corp., Houston, Tex.; ExxonMobil/Mobay Chemical Corp., Kansas City, Kans.; Goodyear Chemical, Akron, Ohio; BASF Corp.; 3M Corp., St. Paul, Minn.; Solutia, Inc., St. Louis, Mo.; DuPont; and Eastman Chemical Co., Wilmington, Del. and Kingsport, Tenn., respectively). The polymer composites are produced via standard blending, mixing, or compounding the constituent materials.

The polymer composites of the present invention may comprise other components, such as fillers, surfactants, organic binders, polymeric binders, crosslinking agents, coupling agents, anti-dripping agents, heat stabilizers, antioxidants, colorants, inks, dyes, or any combination thereof.

The polymer composites of the present invention are used as coatings, or they are used to fabricate articles, such as free-standing films, fibers, fabrics, foams, molded and laminated articles, tubes, adhesives, and fiber reinforced articles. These articles are well-suited for many applications requiring thermal conductivity, electrical conductivity, antibacterial activity, catalytic activity, and combinations thereof.

EXAMPLES

Having generally described the invention, a more complete understanding thereof may be obtained by reference to the following examples, which are provided for purposes of illustration only and do not limit the invention in any way.

Example 1

Multiwalled Carbon Nanotubes with 9% Silver Particles

Multiwalled Carbon Nanotubes (MWNT, VGE-S16) obtained from the University of Kentucky (0.100 g) were dry mixed with silver acetate (0.0155 g) using a mortar and pestle. The solid mixture was transferred to a glass vial and heated in a nitrogen oven at 300° C. for 3 hours. The theoretical amount of silver after reduction is 0.010 g and thus in theory the sample contains 9% by weight silver. The sample was removed and characterized by high resolution scanning electron microscopy (HRSEM). See FIG. 1. The silver particles are uniformly distributed along the length of the MWNTs and are less than 100 nm in size.

Example 2

Multiwalled Carbon Nanotubes with 9% Silver Particles

Multiwalled Carbon Nanotubes (MWNT, VGE-S16) obtained from the University of Kentucky (4.0 g) were dry mixed with silver acetate (0.62 g) using a mortar and pestle. The solid mixture was transferred to a glass vial and heated in a nitrogen oven at 300° C. for 3 hours. The theoretical amount of silver after reduction is 0.40 g, and thus in theory the sample contains 9% by weight silver. The sample was removed and characterized by high resolution scanning electron microscopy. The silver particles are uniformly distributed along the length of the MWNTs and are less than 100 nm in size.

Example 3

Multiwalled Carbon Nanotubes with 17% Silver Particles

Multiwalled Carbon Nanotubes (MWNT, VGE-S16) obtained from the University of Kentucky (0.100 g) were dry mixed with silver acetate (0.0.031 g) using a mortar and pestle. The solid mixture was transferred to a glass vial and heated in a nitrogen oven at 300° C. for 3 hours. The theoretical amount of silver after reduction is 0.020 g, and thus in theory the sample contains 17% by weight silver. The sample was removed and characterized by high resolution scanning electron microscopy. The silver particles are uniformly distributed along the length of the MWNTs and are less than 100 nm in size.

Example 4

Multiwalled Carbon Nanotubes with 23% Silver Particles

Multiwalled Carbon Nanotubes (MWNT, VGE-S16) obtained from the University of Kentucky (0.100 g) were dry mixed with silver acetate (0.0465 g) using a mortar and pestle. The solid mixture was transferred to a glass vial and heated in a nitrogen oven at 300° C. for 3 hours. The theoretical amount of silver after reduction is 0.030 g, and thus in theory the sample contains 23% by weight silver. The sample was removed and characterized by high resolution scanning electron microscopy. The silver particles are uniformly distributed along the length of the MWNTs and are less than 100 nm in size.

Example 5

Multiwalled Carbon Nanotubes with 23% Silver Particles

Multiwalled Carbon Nanotubes (MWNT, VGE-S16) obtained from the University of Kentucky (5.0 g) were dry mixed with silver acetate (2.325 g) using a mortar and pestle. The solid mixture was transferred to a glass vial and heated in a nitrogen oven at 300° C. for 3 hours. The theoretical amount of silver after reduction is 1.5 g, and thus in theory the sample contains 23% by weight silver. The sample was removed and characterized by high resolution scanning electron microscopy. The silver particles are uniformly distributed along the length of the MWNTs and are less than 100 nm in size.

Example 6

Multiwalled Carbon Nanotubes with 33% Silver Particles

Multiwalled Carbon Nanotubes (MWNT, VGE-S16) obtained from the University of Kentucky (0.150 g) were dry mixed with silver acetate (0.116 g) using a mortar and pestle. The solid mixture was transferred to a glass vial and heated in a nitrogen oven at 300° C. for 3 hours. The theoretical amount of silver after reduction is 0.075 g, and thus in theory the sample contains 33% by weight silver. The sample was removed and characterized by high resolution scanning electron microscopy. The silver particles are uniformly distributed along the length of the MWNTs and are less than 100 nm in size.

Example 7

Multiwalled Carbon Nanotubes with 50% Silver Particles

Multiwalled Carbon Nanotubes (MWNT, VGE-S16) obtained from the University of Kentucky (0.100 g) were dry mixed with silver acetate (0.1548 g) using a mortar and pestle. The solid mixture was transferred to a glass vial and heated in a nitrogen oven at 300° C. for 3 hours. The theoretical amount of silver after reduction is 0.100 g, and thus in theory the sample contains 50% by weight silver. The sample was removed and characterized by high resolution scanning electron microscopy. The silver particles are uniformly distributed along the length of the MWNTs and are less than 100 nm in size.

Example 8

Graphite with 9% Silver Particles

Graphite (0.100 g Grade 3775) obtained from Asbury Carbons, Inc. was dry mixed with silver acetate (0.0155 g) using a mortar and pestle. The solid mixture was transferred to a glass vial and heated in a nitrogen oven at 300° C. for 3 hours. The theoretical amount of silver after reduction is 0.0100 g, and thus in theory the sample contains 9% by weight silver. The sample was removed and characterized by high resolution scanning electron microscopy. The silver particles are uniformly distributed along the surface of the graphite and are less than 100 nm in size.

Example 9

Graphite with 9% Silver Particles

Graphite (6.000 g, Grade 3775) obtained from Asbury Carbons, Inc. was dry mixed with silver acetate (0.9285 g) using a mortar and pestle. The solid mixture was transferred to a glass vial and heated in a nitrogen oven at 300° C. for 3 hours. The theoretical amount of silver after reduction is 0.600 g, and thus in theory the sample contains 9% by weight silver. The sample was removed and characterized by high resolution scanning electron microscopy. The silver particles are uniformly distributed along the surface of the graphite and are less than 100 nm in size.

Example 10

Graphite with 17% Silver Particles

Graphite (0.100 g, Grade 3775) obtained from Asbury Carbons, Inc. was dry mixed with silver acetate (0.0309 g) using a mortar and pestle. The solid mixture was transferred to a glass vial and heated in a nitrogen oven at 300° C. for 3 hours. The theoretical amount of silver after reduction is 0.0200 g, and thus in theory the sample contains 17% by weight silver. The sample was removed and characterized by high resolution scanning electron microscopy. The silver particles are uniformly distributed along the surface of the graphite and are less than 100 nm in size.

Example 11

Graphite with 23% Silver Particles

Figure 2:
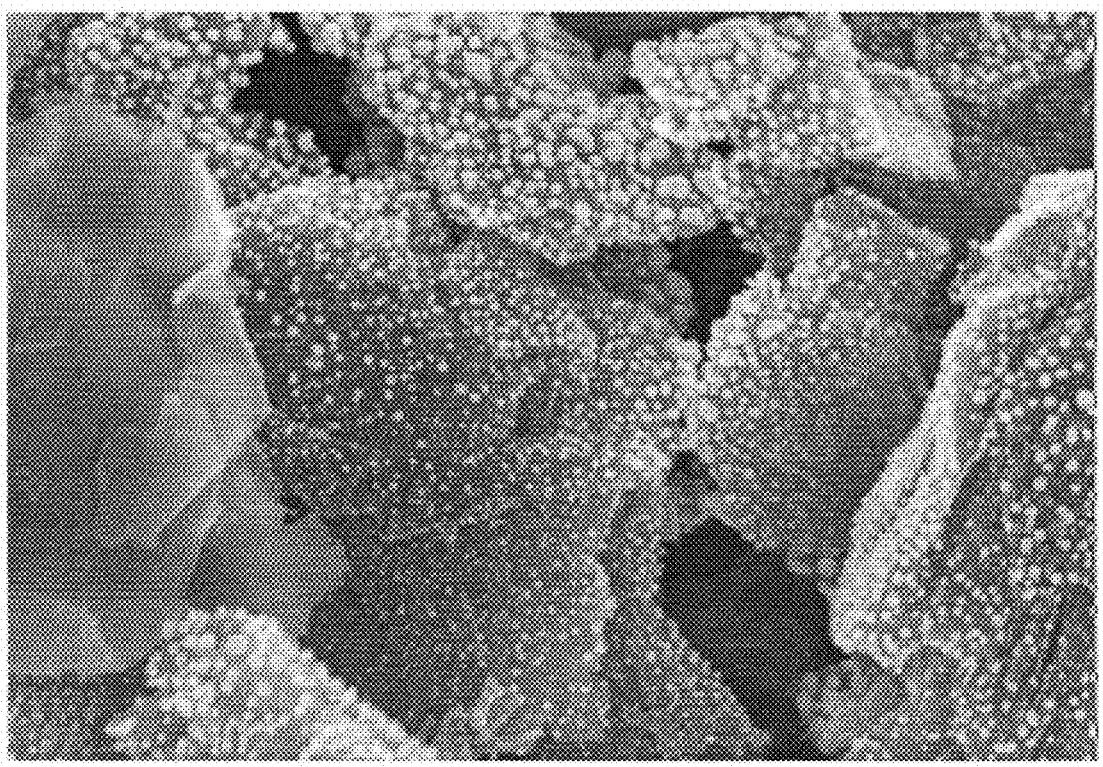
FIG. 2 is a drawing prepared from an HRSEM of a composition according to the present invention, which has been prepared according to the procedure detailed in Example 11 below.

Graphite (0.100 g, Grade 3775) obtained from Asbury Carbons, Inc. was dry mixed with silver acetate (0.0465 g) using a mortar and pestle. The solid mixture was transferred to a glass vial and heated in a nitrogen oven at 300° C. for 3 hours. The theoretical amount of silver after reduction is 0.0300 g, and thus in theory the sample contains 23% by weight silver. The sample was removed and characterized by high resolution scanning electron microscopy (FIG. 5). The silver particles are uniformly distributed along the surface of the graphite and are less than 100 nm in size. See FIG. 2.

Example 12

Graphite with 23% Silver Particles

Graphite (6.000 g, Grade 3775) obtained from Asbury Carbons, Inc. was dry mixed with silver acetate (2.79 g) using a mortar and pestle. The solid mixture was transferred to a glass vial and heated in a nitrogen oven at 300° C. for 3 hours. The theoretical amount of silver after reduction is 1.80 g, and thus in theory the sample contains 23% by weight silver. The sample was removed and characterized by high resolution scanning electron microscopy. The silver particles are uniformly distributed along the surface of the graphite and are less than 100 nm in size.

Example 13

Graphite with 33% Silver Particles

Graphite (0.100 g, Grade 3775) obtained from Asbury Carbons, Inc. was dry mixed with silver acetate (0.0775 g) using a mortar and pestle. The solid mixture was transferred to a glass vial and heated in a nitrogen oven at 300° C. for 3 hours. The theoretical amount of silver after reduction is 0.05 g, and thus in theory the sample contains 33% by weight silver. The sample was removed and characterized by high resolution scanning electron microscopy. The silver particles are uniformly distributed along the surface of the graphite and are less than 100 nm in size.

Example 14

Carbon Nanofibers with 9% Silver Particles

Carbon nanofibers (0.100 g, PR-24-HHT-LD) obtained from Applied Sciences, Inc. were dry mixed with silver acetate (0.0155 g) using a mortar and pestle. The solid mixture was transferred to a glass vial and heated in a nitrogen oven at 300° C. for 3 hours. The theoretical amount of silver after reduction is 0.010 g, and thus in theory the sample contains 9% by weight silver. The sample was removed and characterized by high resolution scanning electron microscopy. The silver particles are uniformly distributed along the surface of the carbon nanofibers and are less than 100 nm in size.

Example 15

Multiwalled Carbon Nanotubes with 9% Palladium Particles

Multiwalled Carbon Nanotubes (MWNT, VGE-S16) obtained from the University of Kentucky (0.100 g) were dry mixed with palladium acetate (0.0211 g) using a mortar and pestle. The solid mixture was transferred to a glass vial and heated in a nitrogen oven at 300° C. for 3 hours. The theoretical amount of palladium after reduction is 0.010 g, and thus in theory the sample contains 9% by weight palladium. The sample was removed and characterized by high resolution scanning electron microscopy. The palladium particles are uniformly distributed along the length of the MWNTs and are less than 100 nm in size.

Example 16

Multiwalled Carbon Nanotubes with 9% Palladium Particles

Multiwalled Carbon Nanotubes (MWNT, VGE-S16) obtained from the University of Kentucky (0.100 g) were dry mixed with $PdCl_2(S(CH_3)_2)_2$ (0.0285 g) using a mortar and pestle. The solid mixture was transferred to a glass vial and heated in a nitrogen oven at 300° C. for 3 hours. The theoretical amount of palladium after reduction is 0.010 g, and thus in theory the sample contains 9% by weight palladium. The sample was removed and characterized by high resolution scanning electron microscopy. The palladium particles are uniformly distributed along the length of the MWNTs and are less than 100 nm in size.

Example 17

Multiwalled Carbon Nanotubes with 9% Palladium Particles

Multiwalled Carbon Nanotubes (MWNT, VGE-S16) obtained from the University of Kentucky (0.100 g) were dry mixed with $PdCl_2$ (0.0167 g) using a mortar and pestle. The solid mixture was transferred to a glass vial and heated in a nitrogen oven at 300° C. for 3 hours. The theoretical amount of palladium after reduction is 0.010 g, and thus in theory the sample contains 9% by weight palladium. The sample was removed and characterized by high resolution scanning electron microscopy. The palladium particles are uniformly distributed along the length of the MWNTs and are less than 100 nm in size.

Example 18

Graphite with 9% Palladium Particles

Graphite (0.100 g, Grade 3775) obtained from Asbury Carbons, Inc. was dry mixed with palladium acetate (0.0211 g) using a mortar and pestle. The solid mixture was transferred to a glass vial and heated in a nitrogen oven at 300° C. for 3 hours. The theoretical amount of palladium after reduction is 0.01 g, and thus in theory the sample contains 9% by weight palladium. The sample was removed and characterized by high resolution scanning electron microscopy. The palladium particles are uniformly distributed along the surface of the graphite and are less than 100 nm in size.

Example 19

Multiwalled Carbon Nanotubes with 9% Platinum Particles

Multiwalled Carbon Nanotubes (MWNT, VGE-S16) obtained from the University of Kentucky (0.050 g) were dry mixed with platinum acetate (0.0008 g) using a mortar and pestle. The solid mixture was transferred to a glass vial and heated in a nitrogen oven at 300° C. for 3 hours. The theoretical amount of platinum after reduction is 0.005 g, and thus in theory the sample contains 9% by weight platinum. The sample was removed and characterized by high resolution scanning electron microscopy. The platinum particles are uniformly distributed along the length of the MWNTs and are less than 100 nm in size.

Example 20

Multiwalled Carbon Nanotubes with 9% Platinum Particles

Multiwalled Carbon Nanotubes (MWNT, VGE-S16) obtained from the University of Kentucky (0.100 g) were dry mixed with $PtCl_2(S(CH_3)_2)_2$ (0.020 g) using a mortar and pestle. The solid mixture was transferred to a glass vial and heated in a nitrogen oven at 300° C. for 3 hours. The theoretical amount of platinum after reduction is 0.010 g, and thus in theory the sample contains 9% by weight platinum. The sample was removed and characterized by high resolution scanning electron microscopy. The platinum particles are uniformly distributed along the length of the MWNTs and are less than 100 nm in size.

Example 21

Multiwalled Carbon Nanotubes with 9% Platinum Particles

Multiwalled Carbon Nanotubes (MWNT, VGE-S16) obtained from the University of Kentucky (0.100 g) were dry mixed with $PtK_2Cl_4$ (0.0212 g) using a mortar and pestle. The solid mixture was transferred to a glass vial and heated in a nitrogen oven at 300° C. for 3 hours. The theoretical amount of platinum after reduction is 0.010 g, and thus in theory the sample contains 9% by weight platinum. The sample was removed and characterized by high resolution scanning electron microscopy. The platinum particles are uniformly distributed along the length of the MWNTs and are less than 100 nm in size.

Example 22

Graphite with 9% Platinum Particles

Graphite (0.050 g, Grade 3775) obtained from Asbury Carbons, Inc. was dry mixed with platinum acetate (0.008 g) using a mortar and pestle. The solid mixture was transferred to a glass vial and heated in a nitrogen oven at 300° C. for 3 hours. The theoretical amount of platinum after reduction is 0.005 g, and thus in theory the sample contains 9% by weight platinum. The sample was removed and characterized by high resolution scanning electron microscopy. The platinum particles are uniformly distributed on the surface of the graphite and are less than 100 nm in size.

Example 23

Graphite with 9% each of Platinum and Silver Particles

Graphite (0.10 g, Grade 3775) obtained from Asbury Carbons, Inc. was dry mixed with silver acetate (0.0155 g) and platinum acetate (0.0161 g) using a mortar and pestle. The solid mixture was transferred to a glass vial and heated in a nitrogen oven at 300° C. for 3 hours. The theoretical amount of silver after reduction is 0.010 g, and platinum after reduction is 0.010 g, and thus in theory the sample contains 9% of silver and 9% of platinum by weight. The sample was removed and characterized by high resolution scanning electron microscopy. The silver and platinum particles are uniformly distributed on the surface of the graphite and are less than 100 nm in size.

Example 24

Graphite with 9% each of Palladium and Silver Particles

Graphite (0.10 g, Grade 3775) obtained from Asbury Carbons, Inc. was dry mixed with silver acetate (0.0155 g) and palladium acetate (0.0211 g) using a mortar and pestle. The solid mixture was transferred to a glass vial and heated in a nitrogen oven at 300° C. for 3 hours. The theoretical amount of silver after reduction is 0.010 g, and palladium after reduction is 0.010 g and thus in theory the sample contains 9% of silver and 9% palladium by weight. The sample was removed and characterized by high resolution scanning electron microscopy. The silver and platinum particles are uniformly distributed on the surface of the graphite and are less than 100 nm in size.

Example 25

Multiwalled Carbon Nanotubes with 9% Gold Particles

Multiwalled Carbon Nanotubes (MWNT, VGE-S16) obtained from the University of Kentucky (0.100 g) were dry mixed with $AuCl_4H$ (0.0197 g) using a mortar and pestle. The solid mixture was transferred to a glass vial and heated in a nitrogen oven at 300° C. for 3 hours. The theoretical amount of gold after reduction is 0.010 g, and thus in theory the sample contains 9% by weight gold. The sample was removed and characterized by high resolution scanning electron microscopy. The gold particles are uniformly distributed along the length of the MWNTs and are less than 100 nm in size.

Example 26

Carbon Black with 9% Silver Particles

Carbon black (Thermax Powder N-991), obtained from the Cancarb, Ltd. (0.100 g) was dry mixed with silver acetate (0.0155 g) using a mortar and pestle. The solid mixture was transferred to a glass vial and heated in a nitrogen oven at 300° C. for 3 hours. The theoretical amount of silver after reduction is 0.010 g, and thus in theory the sample contains 9% by weight silver. The sample was removed and characterized by high resolution scanning electron microscopy. The silver particles are relatively uniformly distributed on the surface of the carbon black and are less than 100 nm in size.

Example 27

Single Walled Carbon Nanotubes (SWNT) with 9% Silver Particles

SWNTs obtained from the Nanoledge, Inc. (0.100 g) were dry mixed with silver acetate (0.0155 g) using a mortar and pestle. The solid mixture was transferred to a glass vial and heated in a nitrogen oven at 300° C. for 3 hours. The theoretical amount of silver after reduction is 0.010 g, and thus in theory the sample contains 9% by weight silver. The sample was removed and characterized by high resolution scanning electron microscopy. The silver particles are relatively uniformly distributed on the surface of the SWNTs and are less than 100 nm in size.

Example 28

Multiwalled Carbon Nanotubes with 9% Silver Particles

Multiwalled Carbon Nanotubes (MWNT, VGE-S16) obtained from the University of Kentucky (0.100 g) were dry mixed with silver acetate (0.0155 g) using a mortar and pestle. The solid mixture was transferred to a glass vial and heated in a forced air oven at 300° C. for 3 hours. The theoretical amount of silver after reduction is 0.010 g, and thus in theory the sample contains 9% by weight silver. The sample was removed and characterized by high resolution scanning electron microscopy. The silver particles are uniformly distributed along the length of the MWNTs and are less than 100 nm in size.

Example 29

Multiwalled Carbon Nanotubes with 23% Silver Particles

Multiwalled Carbon Nanotubes (MWNT, VGE-S16) obtained from the University of Kentucky (0.100 g) were dry mixed with silver acetate (0.0465 g) using a mortar and pestle. The solid mixture was transferred to a glass vial and heated in a forced air oven at 300° C. for 3 hours. The theoretical amount of silver after reduction is 0.030 g, and thus in theory the sample contains 9% by weight silver. The sample was removed and characterized by high resolution scanning electron microscopy. The silver particles are uniformly distributed along the length of the MWNTs and are less than 100 nm in size.

Example 30

Graphite with 9% Silver Particles

Graphite (0.1000 g, Grade 3775) obtained from Asbury Carbons, Inc. was dry mixed with silver acetate (0.0155 g) using a mortar and pestle. The solid mixture was transferred to a glass vial and heated in a forced air oven at 300° C. for 3 hours. The theoretical amount of silver after reduction is 0.0100 g, and thus in theory the sample contains 9% by weight silver. The sample was removed and characterized by high resolution scanning electron microscopy. The silver particles are uniformly distributed along the surface of the graphite and are less than 100 nm in size.

Example 31

Graphite with 23% Silver Particles

Graphite (0.1000 g, Grade 3775) obtained from Asbury Carbons, Inc. was dry mixed with silver acetate (0.0465 g) using a mortar and pestle. The solid mixture was transferred to a glass vial and heated in a forced air oven at 300° C. for 3 hours. The theoretical amount of silver after reduction is 0.0100 g, and thus in theory the sample contains 23% by weight silver. The sample was removed and characterized by high resolution scanning electron microscopy. The silver particles are uniformly distributed along the surface of the graphite and are less than 100 nm in size.

Example 32

Melt Mixing of 9% Silver/Graphite with a Polyimide

The samples were prepared by melt mixing the 9% silver/graphite at 20 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 33

Melt Mixing of 23% Silver/Graphite with a Polyimide

The samples were prepared by melt mixing the 23% silver/graphite at 20 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 34

Melt Mixing of 9% Silver/MWNT with a Polyimide

The samples were prepared by melt mixing the 9% silver/graphite at 20 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 35

Melt Mixing of 23% Silver/MWNT with a Polyimide

The samples were prepared by melt mixing the 23% silver/graphite at 20 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

The melt viscosities of examples 32-35 are presented in the Table I below.

TABLE I

| Example | Melt viscosity, Poise |
|---|---|
| 9% Ag/EG (Example 32) | 47760 |
| 23% Ag/EG (Example 33) | 34861 |
| 9% Ag/MWCNT (Example 34) | 48364 |
| 23% Ag/MWCNT (Example 35) | 65566 |

Shear rate: 92.5/sec, Temperature: 325° C.

Example 36

Preparation of Extruded Films from Examples 32-35

Samples of examples 32-35 were extruded through a Laboratory Mixing Extruder (LME, Dynisco, Inc) at a barrel temperature of 170° C. and a die temperature of 350° C. The dimensions of the die were 0.38 mm×19.1 mm. The tensile properties of the extruded films are provided below in Table II.

TABLE II

Tensile properties of Extruded films of Examples 32-35

| Example | Modulus, ksi | Strength, ksi | Elongation, % |
|---|---|---|---|
| 9% Ag/EG (Example 32) | 736 | 14 | 4 |
| 23% Ag/EG (Example 33) | 733 | 13 | 3 |
| 9% Ag/MWCNT (Example 34) | 468 | 14 | 5 |
| 23% Ag/MWCNT (Example 35) | 412 | 12 | 4 |

Example 37

Preparation of Moldings from Extruded Films

Extruded films prepared according to Example 36 were stacked together and compression molded at 270° C., 250 psi for 3 h between the plates of a compression molding press (Carver). The molded samples were then sliced using a diamond wafering blade (Buehler Ltd).

Example 38

9% Ag/MWNT/Graphite (MWNT/Graphite Ratio 1:1)

Multiwalled Carbon Nanotubes (MWNT, VGE-S16) obtained from the University of Kentucky (0.050 g) and graphite (0.050 g, Grade 3775) obtained from Asbury Carbons, Inc. were dry mixed with silver acetate (0.0155 g) using a mortar and pestle. The solid mixture was transferred to a glass vial and heated in a nitrogen oven at 300° C. for 3 hours. The theoretical amount of silver after reduction is 0.010 g, and thus in theory the sample contains 9% by weight silver. The sample was removed and characterized by high resolution scanning electron microscopy. The silver particles are uniformly distributed along the length of the MWNTs and are less than 100 nm in size.

Example 39

9% Ag/Fullerene

Fullerene (0.100 g) was dry mixed with silver acetate (0.0155 g) using a mortar and pestle. The solid mixture was transferred to a glass vial and heated in a nitrogen oven at 300° C. for 3 h. The theoretical amount of silver after reduction is 0.010 g, and thus in theory the sample contains 9% by weight silver. The sample was removed and characterized by high resolution scanning electron microscopy. The silver particles are uniformly distributed along the fullerenes and are less than 100 nm in size.

Example 40

8.5% Ag/Oxidized MWNT

To a 500 mL round-bottom flask was charged MWCNTs (VGE S16, 3.52 g) and nitric acid (275 mL). The mix was brought to a gentle reflux and maintained for about 16 h. After cooling to room temperature, the oxidized MWCNTs were recovered by vacuum filtration. The MWCNTs were repeatedly washed in water till the wash solution had a pH of about 7 as determined with litmus paper. The product was air dried at about 110° C. for about 12 h to afford 2.52 g of oxidized material. To a tared beaker was added 0.1251 g of nitric acid treated MWCNTs and 0.0194 g of silver acetate. These were manually mixed with a spatula. The mixture was then heated to 350° C. for 5 h under nitrogen. The amount of product recovered was 0.1268 g (93%). The theoretical loading of silver was 8.5%.

Example 41

9% Ag/MWNT Via Microwave Heating

Multiwalled Carbon Nanotubes (MWNT, VGE-S16) obtained from the University of Kentucky (0.100 g) were dry mixed with silver acetate (0.0155 g) using a mortar and pestle. The solid mixture was transferred to a glass vial and flushed with nitrogen gas. The glass vial was heated in a CEM Microwave reactor to a temp of about 260° C. for 1-2 minutes. The theoretical amount of silver after reduction is 0.010 g, and thus in theory the sample contains 9% by weight silver. The sample was removed and characterized by high resolution scanning electron microscopy. The silver particles are distributed along the length of the MWNTs and are less than 100 nm in size.

Example 42

Carbon Nanofiber with 9% Silver Particles

Carbon nanofibers obtained from Pyrograf Products, Inc., grade PR-19-LHT-LD (0.100 g) were dry mixed with silver acetate (0.0155 g) using a mortar and pestle. The solid mixture was transferred to a glass vial and heated in a nitrogen oven at 300° C. for 3 hours. The theoretical amount of silver after reduction is 0.010 g, and thus in theory the sample contains 9% by weight silver. The silver particles are uniformly distributed along the length of the carbon nanofibers and are less than 100 nm in size.

Example 43

Melt Mixing of 9% Silver/Graphite with a Polyimide

The samples were prepared by melt mixing the 9% silver/graphite at 0.5 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 44

Melt Mixing of 9% Silver/Graphite with a Polyimide

The samples were prepared by melt mixing the 9% silver/graphite at 2.0 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 45

Melt Mixing of 9% Silver/Graphite with a Polyimide

The samples were prepared by melt mixing the 9% silver/graphite at 5.0 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 46

Melt Mixing of 23% Silver/Graphite with a Polyimide

The samples were prepared by melt mixing the 23% silver/graphite at 0.5 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 47

Melt Mixing of 23% Silver/Graphite with a Polyimide

The samples were prepared by melt mixing the 23% silver/graphite at 2.0 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 48

Melt Mixing of 23% Silver/Graphite with a Polyimide

The samples were prepared by melt mixing the 23% silver/graphite at 5.0 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 49

Melt Mixing of 33% Silver/Graphite with a Polyimide

The samples were prepared by melt mixing the 33% silver/graphite at 0.5 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 50

Melt Mixing of 33% Silver/Graphite with a Polyimide

The samples were prepared by melt mixing the 33% silver/graphite at 2.0 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 51

Melt Mixing of 33% Silver/Graphite with a Polyimide

The samples were prepared by melt mixing the 33% silver/graphite at 5.0 wt % with Ultem™ 1000 (GE Plastics) in a Brabender Plasticorder PL 2000 (30 cc capacity) at a temperature of 325° C. and 25 rpm for 3 h. Upon completion of mixing the material was ground in a Mini-Granulator (Kayeness, Inc) using a 5.5 mm screen.

Example 52

Multiwalled Carbon Nanotubes with 9% Iron Particles

Multiwalled Carbon Nanotubes (MWNT, VGE-S16) obtained from the University of Kentucky (0.1 g) were dry mixed with iron (II) acetate (0.0311 g) using a mortar and pestle. The solid mixture was transferred to a glass vial and heated in a nitrogen oven at 300° C. for 3 hours. The theoretical amount of iron after reduction is 0.009 g, and thus in theory the sample contains 9% by weight iron.

Example 53

Wide Angle X-Ray Diffraction (XRD)

Figure 3:
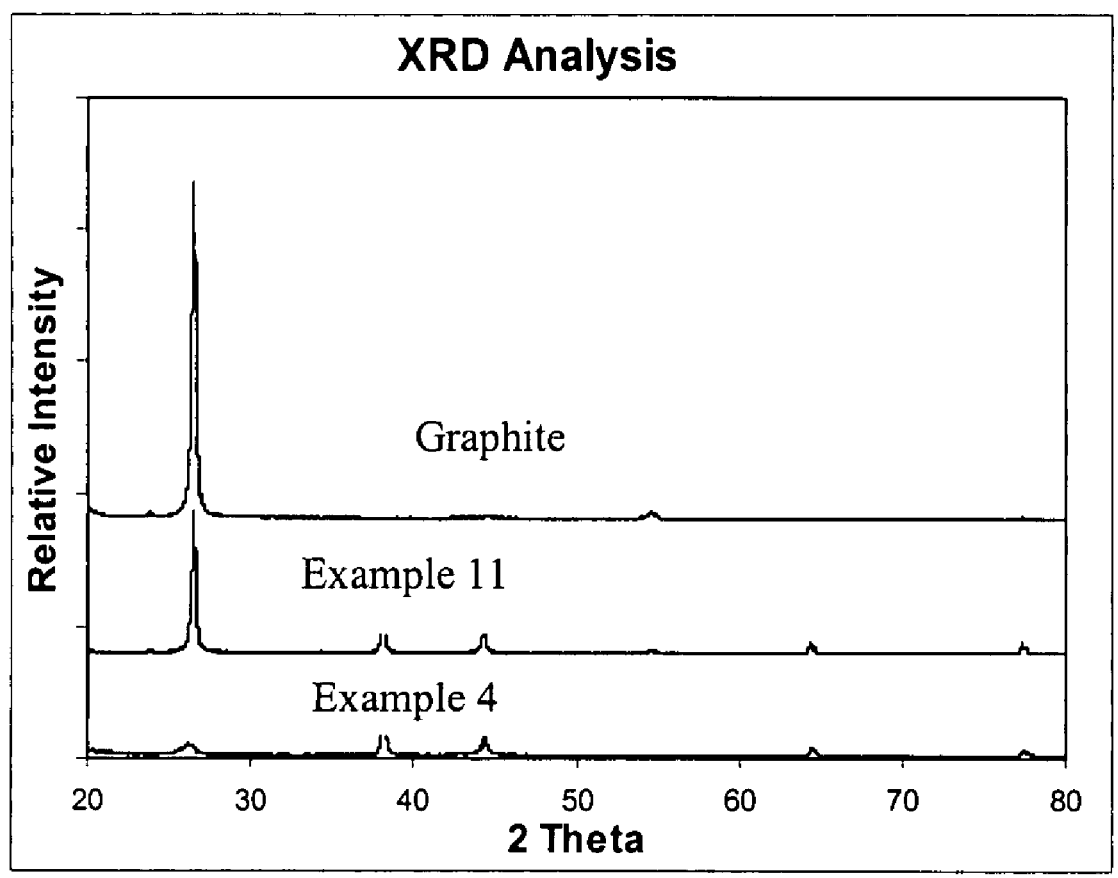
FIG. 3 is a drawing of a graph of information based on analyses obtained from a Wide Angle X-Ray Diffraction (XRD) detailed in Examples 4 and 11. See Example 53 below.

XRD analyses were performed on representative examples to determine the form of the metal present (i.e. zero valence metal, oxide form, etc). The results for Examples 4 and 11, and as-received graphite (grade 3775 obtained from Asbury Carbons, Inc.) are presented in the graph in FIG. 3.

We claim:

1. A process for depositing nanometer-sized metal particles onto substrates in the absence of aqueous solvents, organic solvents and reducing agents, and without any required treatment of the substrate, which process comprises:
    a) preparing an admixture of a metal compound and a substrate by dry mixing a chosen amount of the metal compound with a chosen amount of the substrate; and
    b) heating the admixture in an amount sufficient to deposit zero valence metal particles onto the substrate.

2. The process of claim 1, wherein the admixture is prepared by dry mixing the metal compound and the substrate until substantial uniformity of the admixture is achieved.

3. The process of claim 1, wherein the substrate is a carbon allotrope.

4. The process of claims 3, wherein the carbon allotrope is a member selected from the group consisting of amorphous carbon, carbon nanofibers, carbon nanofoam, diamond, fullerene graphite, exfoliated graphite, single-walled carbon nanotubes, multi-walled carbon nanotubes, double walled carbon nanotubes, lonsdaleite, and aggregated diamond nanorods.

5. The process of claim 4, wherein the carbon allotrope is a member selected from the group consisting of amorphous carbon, exfoliated graphite, fullerene, carbon nanofibers, single-walled carbon nanotubes, double walled carbon nanotubes, and multi-walled carbon nanotubes.

6. The process of claim 1, wherein the metal comprising the metal compound is a member selected from the group consisting of Fe, Co, Ni, Ru, Rh, Pd, Os, Ir, Pt, Cu, Ag, Au, Zn, Cd and Hg.

7. The process of claim 6 wherein the metal comprising the metal compound is a member selected from the group consisting of Pd, Os, Ir, Pt, Ag, Fe and Au.

8. The process of claim 1, wherein the particle size of the metal particles which have been deposited on the substrate is between about 1 nanometer and about 500 nanometers.

9. The process of claim 1, wherein the metal compound is selected from the group consisting of silver acetate, iron acetate, palladium acetate, platinum acetate, auric acid, palladium tetrachloride, palladium dichloride dimethylsulfide, platinum dichloride dimethylsulfide, and platinum potassium chloride, and wherein energy is supplied to the admixture by heating the admixture to a temperature of between about 250 degrees Celsius and about 350 degrees Celsius for a period of about 2 hours to about 6 hours.

* * * * *

UNITED STATES PATENT AND TRADEMARK OFFICE
CERTIFICATE OF CORRECTION

PATENT NO.         : 7,704,553 B2                                          Page 1 of 1
APPLICATION NO.    : 11/710386
DATED              : April 27, 2010
INVENTOR(S)        : Kent A. Watson et al.

It is certified that error appears in the above-identified patent and that said Letters Patent is hereby corrected as shown below:

On title page, item 75 Inventors,
replace "Joseph G. Smith"
with "Joseph G. Smith, Jr."

Signed and Sealed this

Twenty-seventh Day of July, 2010

David J. Kappos
*Director of the United States Patent and Trademark Office*